United States Patent [19]
Woerner

[11] Patent Number: 5,184,878
[45] Date of Patent: Feb. 9, 1993

[54] AIR BRAKE SYSTEM HAVING AN ANTI-SKID ASSEMBLY

[75] Inventor: Dieter Woerner, Pleidelsheim, Fed. Rep. of Germany

[73] Assignee: Robert Bosch GmbH, Stuttgart, Fed. Rep. of Germany

[21] Appl. No.: 523,788

[22] Filed: May 16, 1990

[30] Foreign Application Priority Data

Jun. 28, 1989 [DE] Fed. Rep. of Germany ....... 3921078

[51] Int. Cl.⁵ .................................................. B60T 8/32
[52] U.S. Cl. ................................ 303/118.1; 303/119.2
[58] Field of Search ........................... 303/118, 119 SV

[56] References Cited

U.S. PATENT DOCUMENTS

| | | | |
|---|---|---|---|
| 3,744,850 | 7/1973 | Barthlome | 303/119 X |
| 3,950,035 | 4/1976 | Tribe | 303/118 |
| 4,025,127 | 5/1977 | Rembold | 303/118 |
| 4,175,795 | 11/1979 | Mortimer et al. | 303/118 |
| 4,643,491 | 2/1987 | McCann et al. | 303/118 |
| 4,903,576 | 2/1990 | Höffler et al. | 91/459 |

Primary Examiner—Robert J. Oberleitner
Assistant Examiner—P. M. Poon
Attorney, Agent, or Firm—Edwin E. Greigg; Ronald E. Greigg

[57] ABSTRACT

An air brake system having an anti-skid assembly is proposed, which is provided with a switch assembly comprising a relay valve and a magnet valve assembly. In the vicinity of the switch assembly there is a special line, with which the control pressure can be short-circuited with the brake pressure in the pressure maintenance phase. This largely prevents lagging of the brake pressure relative to the control pressure. The air brake system is intended for utility or commercial vehicles.

20 Claims, 2 Drawing Sheets

AIR BRAKE SYSTEM HAVING AN ANTI-SKID ASSEMBLY

BACKGROUND OF THE INVENTION

The invention is based on an air brake system as defined hereinafter.

An air brake system of this kind is known (German Offenlegungsschrift 37 30 779). In such known air brake systems, the problem exists that particularly in the phase of brake pressure increase, before the onset of regulation by the anti-skid assembly, major differences in synchronism between the control pressure and the brake pressure arise. During excessively forceful braking, when the anti-skid assembly comes into play, "pressure maintenance" in the control pressure chamber of the relay valve is far from bringing about any "pressure maintenance" in the brake pressure chamber of the relay valve. As a result, the brake pressure in a pressure maintenance phase rises still further, so that when the anti-skid assembly comes into operation, often very marked wheel speed fluctuations occur. At the least, this endangers the lateral guidance of the motor vehicle.

A similar effect arises in the brake pressure reduction phase, when the pressure in the control chamber of the relay valve is reduced via the magnetic valves, in which case this pressure reduction takes place faster than the pressure reduction in the brake line.

OBJECT AND SUMMARY OF THE INVENTION

The air brake system according to the invention has an advantage over the prior art that the brake pressure is largely adapted to the control pressure. There is a further advantage that the pressure gradient in the control chamber need not be adapted to the pressure gradient in the brake line. Instead, during braking, a substantially higher pressure gradient can be realized in the control chamber, as a result of which the greater deflection of the relay valve that then takes place results in a higher pressure gradient in the brake line.

Substantially more direct control—with less time lag—is achieved, and this control with the magnetic valves and the relay valve can be performed with the same ABS regulation algorithm as in normal control operations. Accordingly, it is important that the system according to the invention does not require any particular signal processing, so that a conventional kind of electronic control unit used with other anti-skid brake systems can be used.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
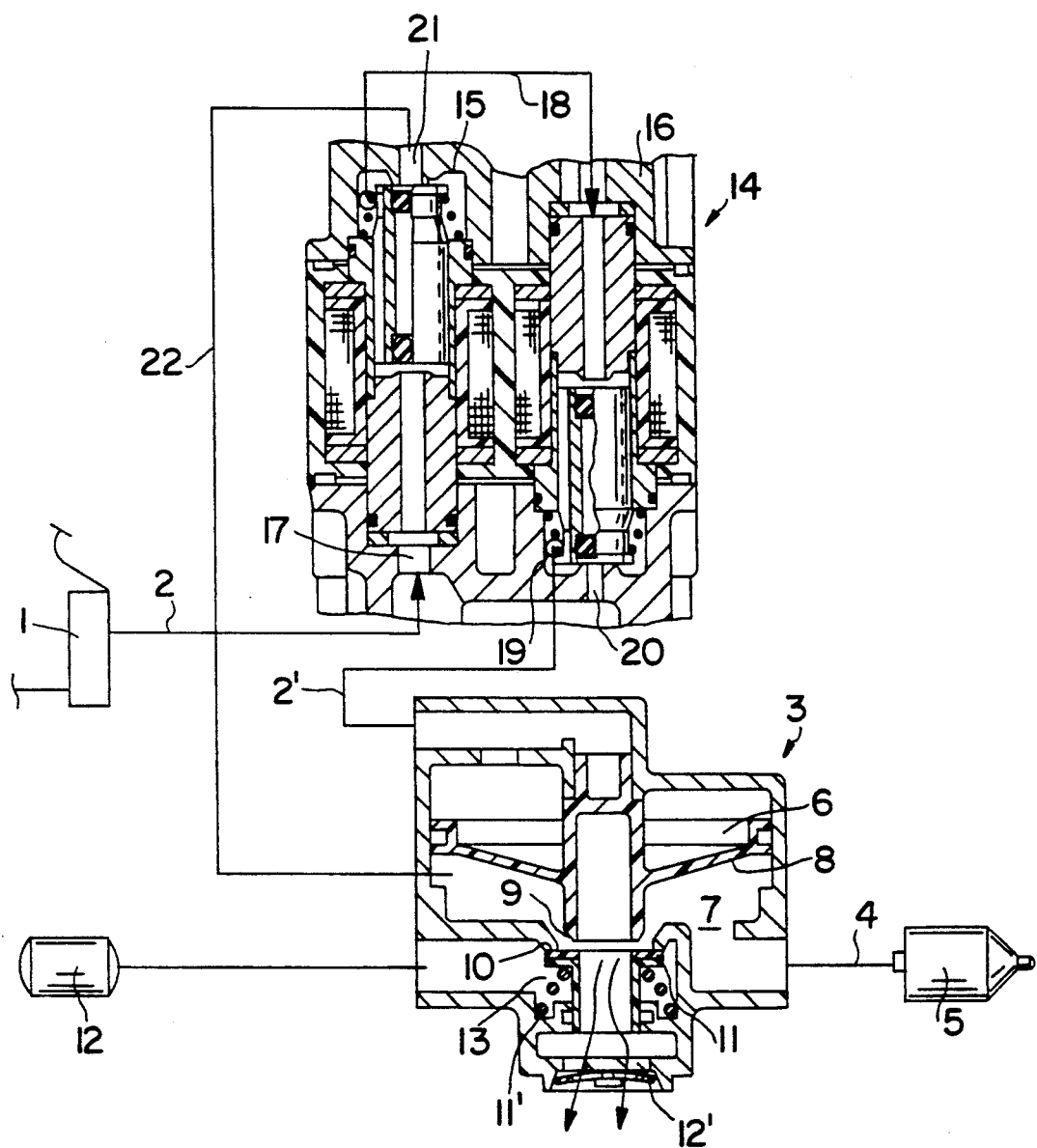
FIG. 1 shows a switch unit comprising two magnetic valves and one relay valve, each shown in section.

An air brake system has a brake control valve 1, which is connected via a control line 2 with a magnet valve assembly 14 which is connected via a line 2' to a relay valve 3. From the relay valve 3, a brake line 4 leads to a brake cylinder 5.

The relay valve 3 is actuated by means of control pressure via the magnetic valve 14. It is located between a fluid supply 12 and the brake cylinder 5 via a relief point and is intended to connect the brake cylinder with the fluid supply, in one switching position, and the brake cylinder to the relief point, in the other position.

The sectional view of the relay valve 3 shows that it has a fluid pressure control chamber 6 communicating with the control line 2, and a brake pressure control chamber 7 leading to the brake line 4. The two chambers 6 and 7 are divided by a relay piston 8 that has an outlet seat 9 of a double seat valve, the inlet seat 10 of which is disposed structurally connected to the housing. Both seats 9 and 10 cooperate with a closing body 11 of the double seat valve; in the position shown, the closing body divides a supply chamber 13, connected to a supply container 12, from the brake chamber 7. Pressure above the relay piston 8 can force the relay piston and seat 9 downwardly so that seat 9 seats on closing body 11 to force closing body 11 downward thereby opening chamber 13 to chamber 7 which supplies fluid from the supply container 12 to the brake cylinder 5.

The relay valve 3 is intended for cooperation with a magnet valve assembly 14 and together with it forms a switch unit 3/14. The magnet valve assembly 14 has two magnet valves 15 and 16 disposed parallel to one another; the left valve is an inlet magnet valve 15, and the right valve is an outlet magnet valve 16. The magnet valve assembly 14 is located in the control line 2, and in the vicinity of the inlet magnet valve 15 it has an inlet 17 connected with the brake control valve 1 and a transverse connection 18 which connects with magnet valve 16. The transverse connection 18 leads to the outlet magnet valve 16 which includes an outlet 19 which is connected to the control chamber 6 of relay valve 3 via control line 2'. The outlet magnet valve 16 also monitors an air connection 20 for the control line 2' which releases fluid pressure from the control chamber 6 of the relay valve 3 to the atmosphere. Finally, the inlet magnet valve 15 also has a valve-monitored outlet 21, from which according to the invention an additional connecting line 22 is extended to the brake chamber 7 of the relay valve 3 or connected with the line 4 to the brake cylinder 5.

Figure 2:
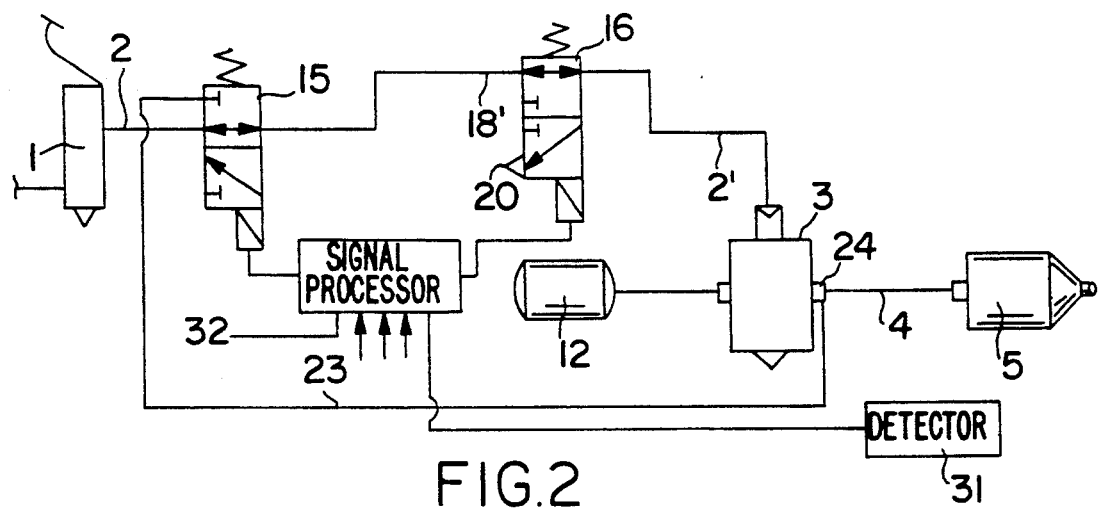
FIG. 2 shows a similar switch unit in a schematic view.

The structure shown schematically in FIG. 2 is largely precisely the same as that of FIG. 1. Corresponding elements are therefore identified by the same reference numerals. Here, connecting line 23, corresponding to the connecting line 22 of FIG. 1, is extended directly from the inlet magnet valve 15 to a brake line connection 24 in line 4 downstream of the relay valve 3, bypassing the relay valve 3. It is therefore to be understood that the line 22 could be connected to the line 4 instead of to the chamber 7, as shown in FIG. 1.

In use of the system for anti-skid regulation, the system includes a wheel rotation detector 31 and a signal processor 32. The wheel detector indicates when the wheel is in a skid and sends a signal to the processor which in turn controls the magnet valves 15 and 16 to release fluid from the brake cylinder to the atmosphere so that pressure is not applied at the wheel during a skid.

Mode of Operation:

During normal operation for braking, the control for control valve 1 is pressed, this permits air flow through the control valve 1, line 2, through relay valves 15 and 16 and on to the relay valve 3, via line 2' where fluid pressure in line 2' flows into chamber 6 to apply a fluid pressure on relay piston 8. Pressure applied to relay piston 8 moves seat 9 down against closing body 11 to force closing body 11 downwardly. Valve seat 10 is then open which permits air pressure from supply container 12 to flow via relay valve 3, chamber 13 and 7 and line 4 to the brake cylinder 5. Thus, a braking pressure is applied to the wheel. If the wheel goes into a skid mode, the wheel detector sends a signal to the signal processor which then applies a current to the armatures of the relay valves 15, 16 to prevent further flow of fluid under pressure to the chamber 6 with a simultaneous opening of outlet 20 to the atmosphere. Release of fluid from the chamber 6 of relay valve 3 permits the relay piston 8 to retract due to pressure in chamber 7. Retraction of relay piston 8 closes valve 10, 11 which in turn permits fluid flow chamber 7 or pressure line 4 back through magnetic valve 15 to release fluid from the wheel cylinder. Thus, the fluid above relay piston 8 is released via outlet 20 to the atmosphere and the fluid in chamber 7 and the wheel cylinder is released through magnet valve 15. Thus wheel slip is avoided.

Figure 3:
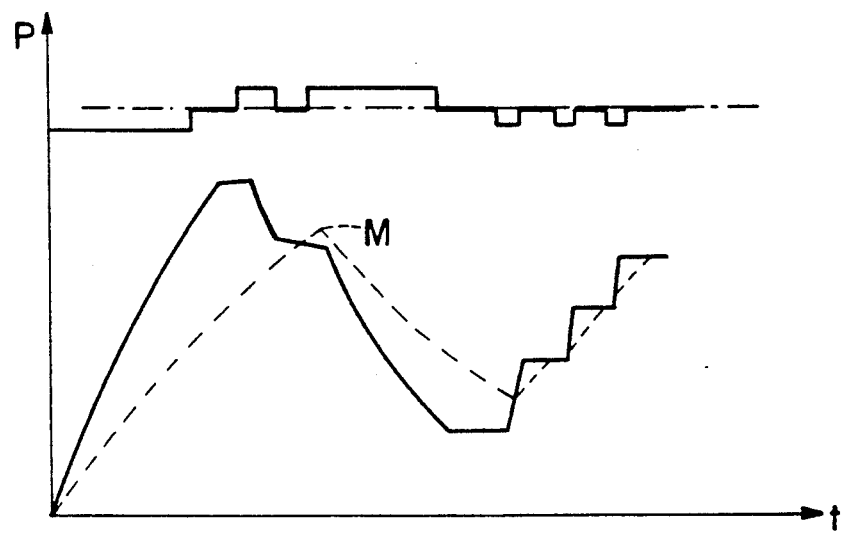
FIG. 3 is a diagram showing the course of the control pressure and brake pressure in an old system belonging to the prior art.

To graphically explain the mode of operation and to distinguish the invention from the prior art, FIG. 3 is a diagram showing a pressure course associated with the prior art. The magnet valve switch times are plotted over the pressure course; the "pressure maintenance" times are shown in the middle, on a dot-dash line; the "pressure buildup" times are plotted below that, and the "pressure reduction" times are shown above it. In the pressure diagram below it, the control pressure is shown as a solid line and the brake pressure as a dashed line.

It can be seen that in the prior art the brake pressure attains its maximum value M quite late, and that even when the control pressure is reduced the brake pressure lags markedly behind.

Figure 4:
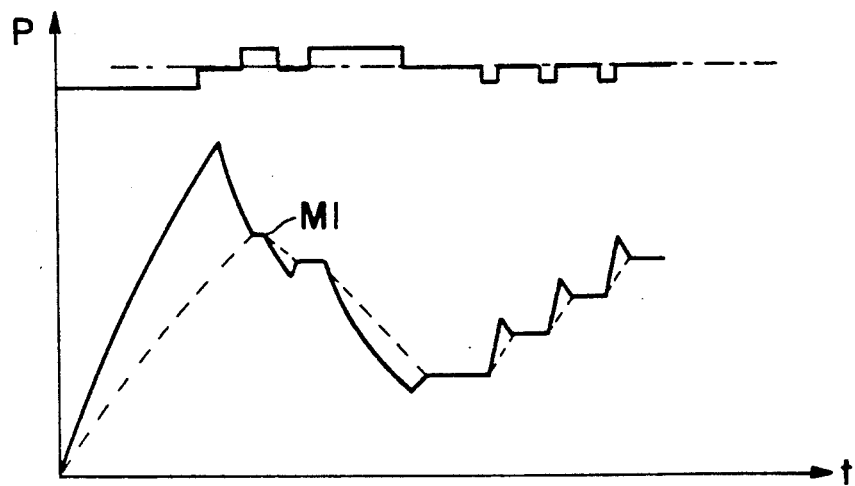
FIG. 4 is a diagram showing the course of the pressure in the systems according to the invention as shown in FIGS. 1 and 2.

FIG. 4 shows the course of pressure according to the invention, with the same magnet valve switching cycles. It can be seen that the short-circuiting of the brake pressure with the control pressure during the pressure maintenance phase now allows the brake pressure to attain a maximum value M1 much earlier, and that even when the control pressure is reduced the brake pressure follows the control pressure very accurately.

This makes it clear that according to the invention, "lagging" of the brake pressure with respect to the control pressure is avoided. It can also be seen that the pressure gradient in the control chamber 6 does not have to be adapted to the pressure gradient of the brake pressure. As a result, a substantially higher pressure gradient can be attained in the control chamber 6, and as a result, with the greater deflection of the relay valve 3 that then occurs, a higher pressure gradient is also obtained in the brake line 4. Because of the largely nonlagging, substantially more direct control, the same ABS regulating algorithm can be used in the switch unit 3/14 as in switch units of the prior art. Accordingly, to achieve the novel control, there is no need to modify the electronic switch assemblies conventionally used.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An air brake system having an anti-skid assembly, including a brake control valve (1), a magnet valve assembly (14), wheel brake cylinders (5), wheel detectors (31), an electronic signal processing means (32) and a relay valve (3), said magnet valve assembly effects a pressure change and pressure maintenance in said relay valve and along with said relay valve forms a fluid switch unit (3/14), said magnet valve assembly receives switching pulses from said electronic signal processing means of the anti-skid assembly to control fluid pressure applied to said wheel brake cylinder, and the system includes a connecting line (22, 23) in a vicinity of the switch unit (3/14) for direct communication between a brake pressure control chamber (7) of said relay valve (3) controlled by said brake control valve and a brake pressure determined for actuation of the wheel cylinders (5).

2. An air brake system as defined by claim 1, in which a part of said connecting line (22) extends inside said relay valve (3).

3. An air brake system as defined by claim 2 in which said connecting line (22) extends from an inlet magnet valve (15) of said magnet valve assembly (14) to said brake pressure control chamber (7) of the relay valve (3).

4. An air brake system as defined by claim 3 in which said magnet valve assembly (14) includes an inlet magnet valve (15) and an outlet magnet valve (16) which precedes said relay valve, and said inlet magnet valve (15) is operative to provide a pressure maintenance for said wheel cylinders.

5. An air brake system as defined by claim 4 in which said magnet valve assembly (14 includes two magnet valves that precedes the relay valve, in that one magnet valve is an inlet magnet valve (15) and the other magnet valve is an outlet magnet valve (16), and that said connecting line (22, 23) is connected to the inlet magnet valve (15).

6. An air brake system as defined by claim 3 in which said magnet valve assembly (14 includes two magnet valves that precedes the relay valve, in that one magnet valve is an inlet magnet valve (15) and the other magnet valve is an outlet magnet valve (16), and that said connecting line (22, 23) is connected to the inlet magnet valve (15).

7. An air brake system as defined by claim 2 in which said magnet valve assembly (14) includes an inlet magnet valve (15) and an outlet magnet valve (16) which precedes said relay valve, and said inlet magnet valve (15) is operative to provide a pressure maintenance for said wheel cylinders.

8. An air brake system as defined by claim 7 in which said magnet valve assembly (14) includes two magnet valves that precedes the relay valve, in that one magnet valve is an inlet magnet valve (15) and the other magnet valve is an outlet magnet valve (16), and that said connecting line (22, 23) is connected to the inlet magnet valve (15).

9. An air brake system as defined by claim 2 in which said magnet valve assembly (14) includes two magnet valves that precedes the relay valve, in that one magnet valve is an inlet magnet valve (15) and the other magnet valve is an outlet magnet valve (16), and that said connecting line (22, 23) is connected to the inlet magnet valve (15).

10. An air brake system as defined by claim 1 in which said connecting line (22) extends from an inlet magnet valve (15) of said magnet valve assembly (14) to said brake pressure control chamber (7) of the relay valve (3).

11. An air brake system as defined by claim 10 in which said magnet valve assembly (14) includes an inlet magnet valve (15) and an outlet magnet valve (16) which precedes said relay valve, and said inlet magnet valve (15) is operative to provide a pressure maintenance for said wheel cylinders.

12. An air brake system as defined by claim 11 in which said magnet valve assembly (14) includes two magnet valves that precedes the relay valve, in that one magnet valve is an inlet magnet valve (15) and the other magnet valve is an outlet magnet valve (16), and that said connecting line (22, 23) is connected to the inlet magnet valve (15).

13. An air brake system as defined by claim 10 in which said magnet valve assembly (14) includes two magnet valves that precedes the relay valve, in that one magnet valve is an inlet magnet valve (15) and the other magnet valve is an outlet magnet valve (16), and that said connecting line (22, 23) is connected to the inlet magnet valve (15).

14. An air brake system as defined by claim 1, in which said connecting line (23) extends from an inlet magnet valve (15) of said magnet valve assembly directly to a brake cylinder connection (24) of the relay valve (3).

15. An air brake system as defined by claim 14 in which said magnet valve assembly (14) includes an inlet magnet valve (15) and an outlet magnet valve (16) which precedes said relay valve, and said inlet magnet valve (15) is operative to provide a pressure maintenance for said wheel cylinders.

16. An air brake system as defined by claim 15 in which said magnet valve assembly (14) includes two magnet valves that precedes the relay valve, in that one magnet valve is an inlet magnet valve (15) and the other magnet valve is an outlet magnet valve (16), and that said connecting line (22, 23) is connected to the inlet magnet valve (15).

17. An air brake system as defined by claim 14 in which said magnet valve assembly (14) includes two magnet valves that precedes the relay valve, in that one magnet valve is an inlet magnet valve (15) and the other magnet valve is an outlet magnet valve (16), and that said connecting line (22, 23) is connected to the inlet magnet valve (15).

18. An air brake system as defined by claim 1 in which said magnet valve assembly (14) includes an inlet magnet valve (15) and an outlet magnet valve (16) which precedes said relay valve, and said inlet magnet valve (15) is operative to provide a pressure maintenance for said wheel cylinders.

19. An air brake system as defined by claim 18 in which said magnet valve assembly (14) includes two magnet valves that precedes the relay valve, in that one magnet valve is an inlet magnet valve (15) and the other magnet valve is an outlet magnet valve (16), and that said connecting line (22, 23) is connected to the inlet magnet valve (15).

20. An air brake system as defined by claim 1 in which said magnet valve assembly (14) includes two magnet valves that precedes the relay valve, in that one magnet valve is an inlet magnet valve (15) and the other magnet valve is an outlet magnet valve (16), and that said connecting line (22, 23) is connected to the inlet magnet valve (15).

* * * * *